US008405613B2

(12) United States Patent
Bieber et al.

(10) Patent No.: US 8,405,613 B2
(45) Date of Patent: Mar. 26, 2013

(54) OPTIMIZATION OF STATISTICAL MOVEMENT MEASUREMENT FOR OPTICAL MOUSE, WITH PARTICULAR APPLICATION TO LASER-ILLUMINATED SURFACES

(75) Inventors: Lawrence Bieber, Colorado Springs, CO (US); Michel Willemin, Prêles (CH); Gil Afriat, Monument, CO (US); James Harlod Lauffenburger, Colorado Springs, CO (US); Kevin Scott Buescher, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 1297 days.

(21) Appl. No.: 11/424,764

(22) Filed: Jun. 16, 2006

(65) Prior Publication Data
US 2007/0290121 A1 Dec. 20, 2007

(51) Int. Cl.
*G06M 7/00* (2006.01)
(52) U.S. Cl. ........ 345/166; 345/175; 345/156; 250/221; 250/559.2; 250/208.1; 250/557; 178/18.09; 178/19.05
(58) Field of Classification Search .......... 345/161–167, 345/156–158, 426, 520, 173, 184, 581; 700/83; 250/557, 221, 559.2, 208.1; 341/20; 178/18.06, 178/18.09, 19.05; 710/63; 702/64
See application file for complete search history.

(56) References Cited

U.S. PATENT DOCUMENTS

| | | | |
|---|---|---|---|
| 4,631,400 A | 12/1986 | Tanner et al. | |
| 4,794,384 A | 12/1988 | Jackson | |
| 5,076,678 A | 12/1991 | Grossman et al. | |
| 5,703,356 A * | 12/1997 | Bidiville et al. | 250/221 |
| 5,793,357 A * | 8/1998 | Ivey et al. | 345/166 |
| 6,055,106 A | 4/2000 | Grier et al. | |
| 6,806,458 B2 | 10/2004 | Rotzoll et al. | |
| 7,876,307 B2 | 1/2011 | Bieber et al. | |
| 2002/0105656 A1* | 8/2002 | Nahum et al. | 356/614 |

(Continued)

FOREIGN PATENT DOCUMENTS
WO   WO 03/049018 A1 * 6/2003

OTHER PUBLICATIONS
O.P. Judd, Diffraction From Circular and Irregular Apertures, LA-5391-MS 1-4 (Los Alamos Scientific Laboratory 1973).

(Continued)

*Primary Examiner* — Lun-Yi Lao
*Assistant Examiner* — Olga Merkoulova
(74) *Attorney, Agent, or Firm* — Griffin & Szipl, P.C.

(57) ABSTRACT

A method for measuring relative motion between an illuminated portion of a surface and an optical sensing device comprising a coherent light source and a photodetector device comprising an array of pixels and comparators for extracting motion features. The method includes the steps (a)-(d). Step (a) includes illuminating with the coherent light source the surface portion at a determined flash rate. Step (b) includes detecting, using the array of pixels a speckled light intensity pattern of the illuminated portion of the surface for each flash. Step (c) includes extracting edge direction data of two different types from the detected speckled light intensity patterns. Step (d) includes measuring relative motion between the optical sensing device and the illuminated portion of the surface based on extracted edge direction data. The step of extracting edge direction data further includes a preliminary step of introducing a selecting factor, which promotes detection of one type of edge direction data rather than another type.

10 Claims, 3 Drawing Sheets

U.S. PATENT DOCUMENTS

| | | | |
|---|---|---|---|
| 2003/0085879 A1* | 5/2003 | Shi | 345/166 |
| 2003/0102425 A1 | 6/2003 | Rotzoll et al. | |
| 2005/0001153 A1* | 1/2005 | Lauffenburger et al. | 250/221 |
| 2005/0062720 A1* | 3/2005 | Rotzoll et al. | 345/166 |
| 2005/0190157 A1 | 9/2005 | Oliver et al. | |
| 2006/0023970 A1* | 2/2006 | Wang | 382/312 |
| 2006/0125794 A1 | 6/2006 | Afriat | |
| 2006/0226346 A1* | 10/2006 | Bieber et al. | 250/221 |

OTHER PUBLICATIONS

John P. Barton, Electromagnetic Field Calculations for a Sphere Illuminated by a Higher-order Gaussian Beam. II. Far-Field Scattering, 37 Applied Optics 3339-3344 (1998).

Darwin Palima et al., Generalized Phase Contrast Matched to Gaussian Illumination, 15 Optics Express 11971-11977 (2007).

M.J. Wang et al., Investigation on the Scattering Characteristics of Gaussian Beam from Two Dimensional Dielectric Rough Surfaces Based on Kirchhoff Approximation, 4 Progress in Electromagnetics Research B 223-235 (2008).

p. 284 and p. 1155 of Webster's Ninth New Collegiate Dictionary (1990).

Parker, J.R. et al., "Thresholding Using an Illumination Model," Proceedings of the Second International Conference on Document Analysis and Recognition, pp. 270-273, (1993).

"Contrast in Optical Microscopy," 6 pages, downloaded from www.olympusmicro.com/primer/techniques/contrast.html on Feb. 24, 2011.

Smith, Warren J. "Modern optical engineering," pp. 163-165, (2000).

Miller, John, Surf Progress Report One: Non-Gaussian Beams for Interferometric Gravitational Wave Detectors (2005), filed herewith as Exhibit B1.

* cited by examiner

OPTIMIZATION OF STATISTICAL MOVEMENT MEASUREMENT FOR OPTICAL MOUSE, WITH PARTICULAR APPLICATION TO LASER-ILLUMINATED SURFACES

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical motion sensing device including a photodetector array for measuring the varying intensity pattern of a portion of a surface which is illuminated with radiation of a laser illuminated source and for extracting information about the relative motion between the photodetector array and the illuminated portion of the surface.

BACKGROUND OF THE INVENTION

Optical pointing devices incorporating a laser illuminated source are already known in the art. Such laser illumination allows optical pointing devices such as mice to work on a much wider variety of surfaces. However the coherent nature of the illumination results in a received image that contains generally high spatial frequencies especially compared to viewing the same surface with a non coherent LED illumination. This high frequency content leads to spatial aliasing due to beyond under-sampled (in the spatial domain). This aliasing leads to several bad effects, such as loss of resolution or apparent "reverse" motion (the "wagon-wheel in motion pictures" effect). One alternative to deal with the higher spatial frequency content is to create smaller pixels (higher spatial capability in the imager). But, two major problems arise with smaller pixels that are a lower mouse-speed/acceleration capability and a lower sensitivity to light (less collection area in the pixel).

U.S. patent application Ser. No. 11/165,537, filed in the name of the same Assignee and which is incorporated in its entirety herein by reference, for instance discloses a method for measuring relative motion between an illuminated portion of a surface and an optical sensing device comprising a coherent light source and a photodetector array, the method comprising the steps of:

illuminating under a determined gradient by means of the coherent light source the surface portion at a determined flash rate;
detecting by means of the photodetector array speckled light intensity pattern of the illuminated portion of the surface for a first flash;
detecting a second speckled light intensity pattern of the illuminated portion of the surface for a second flash;
extracting motion features of two different types from the detected first and second speckled light intensity patterns;
keeping only pairs of neighbouring motion features including one motion feature of both different types;
determining a measurement of the relative motion between the optical sensing device and the illuminated surface portion based on a comparison of kept motion features.

Although such a solution as disclosed in U.S. patent application Ser. No. 11/165,537 presents several advantages in dealing with a coherent light source in an optical pointing device, since laser illumination has a very large spectral content, there is still a need to further and better control the quantity of data needed to determine a measurement of relative between the optical pointing device and the illuminated surface portion.

SUMMARY OF THE INVENTION

One goal of the present invention is thus to implement a simpler and more reliable method for measuring relative motion between an illuminated portion of a surface and an optical motion sensing device comprising a coherent light source and a photodetector device comprising an array of pixels and comparators for extracting motion features. For that purpose, the method comprises the steps of:

a) illuminating by the coherent light source the surface portion at a determined flash rate;
b) detecting by the array of pixels a speckled light intensity pattern of the illuminated portion of the surface for each flash;
c) extracting edge direction data of two different types from the detected speckled light intensity patterns by comparing light intensity between pixels;
d) determining a measurement of the relative motion between the optical sensing device and the illuminated portion of the surface based on extracted edge direction data; wherein the extracting edge direction data step comprises a preliminary step consisting of introducing a selecting factor which promotes detection of one type of edge direction data rather than the other type.

Since an inflection is detected as one type of edge followed by the opposite type, increasing the amount of edges of one type with respect to the other will lead to a decrease in the overall inflection count, and thus the density of inflections. It is preferably proposed to introduce an adjustable offset into the comparators in order to decrease the inflection count in the image if it exceeds a given value. There is a need to keep the total inflection density low enough to avoid "confusing" the inflection tracking logic that determines movement. The added offset to these edge detection comparators is adjusted to cause them to prefer "one" type of edge (positive/negative) over the other type.

Thus, in accordance with a first embodiment of the invention, a method is provided for measuring relative motion between an illuminated portion of a surface and an optical sensing device comprising a coherent light source and a photodetector device comprising an array of pixels and comparators for extracting motion features, wherein the method comprises the steps of: (a) illuminating by means of the coherent light source the surface portion at a determined flash rate; (b) detecting by means of the array of pixels a speckled light intensity pattern of the illuminated portion of the surface for each flash; (c) extracting edge direction data of two different types from the detected speckled light intensity patterns by comparing light intensity between pixels; (d) determining a measurement of the relative motion between the optical sensing device and the illuminated portion of the surface based on extracted edge direction data; wherein the extracting edge direction data step comprises a preliminary step consisting of introducing a selecting factor that promotes detection of one type of edge direction data rather than the other type. Furthermore, other advantageous embodiments of the invention are summarized as follows.

In accordance with a second embodiment of the present invention, the first embodiment is modified so that the array of pixels is aligned along first and second axes and divided into four quadrants including upper left, upper right, lower left and lower right quadrants, and wherein the selecting factor is introduced by adding to comparators along the first axis: (i) a positive offset for both left quadrants; (ii) a negative offset for both right quadrants; and by adding to comparators along the second axis: (i) a positive offset for both lower quadrants; and (ii) a negative offset for both upper quadrants. In accordance with a third embodiment of the present invention, the second embodiment is modified so that it further comprises a step consisting of determining the central point of a Gaussian illumination of the coherent light source and wherein the four quadrants are determined in relation with the central point of the Gaussian illumination.

In accordance with a fourth embodiment of the present invention, the first embodiment is modified so that the coherent light source illuminates with a Gaussian shaped beam and wherein the selecting factor is introduced by adding to the comparators an offset that is adjusted in function of the Gaussian roll-off band. In accordance with a fifth embodiment of the present invention, the fourth embodiment is further modified so that the offset is inverted according to the Gaussian roll-off sign.

In accordance with a sixth embodiment of the present invention, the second embodiment is further modified so that an inflection is detected as one type of edge followed by the opposite type, wherein the method further comprises the steps of: (e) counting along both axes the number of inflections for each flash; (f) averaging the inflection count of a determined number of flashes for each axes; (g) comparing the higher inflection count of either the first or the second axis with a defined average inflection count window; and (h) adjusting the offset voltage so that the count will stay within the defined window. In accordance with a seventh embodiment of the present invention, the sixth embodiment is further modified so that the window is defined by minimum and maximum average inflection count values and wherein when the higher inflection count is greater than the maximum average inflection count value, then the offset voltage is increased, and when the higher average inflection count is smaller than the minimum average inflection count, then the offset voltage is decreased. In accordance with an eighth embodiment of the present invention, the seventh embodiment is further modified so that a targeted absolute minimum inflection count is defined and wherein the offset is increased if the higher average inflection count is greater than the maximum average inflection count and if the lower average inflection count is greater than the absolute minimum inflection count.

A refinement can be made to mitigate one issue with the simplest implementation of this offset. That issue is due to the non-uniform illumination of the optical source. Generally the laser will illuminate with a "Gaussian" shaped beam, and so the image will naturally have a Gaussian roll-off convolved with the actual image from the surface. The edges of the roll-off confuse the offset algorithm, and so the action in those regions is not what is desired. On one edge, the number of inflections is decreased, and on the other edge the number is increased. To get around this, the offset is advantageously dependent on which image quadrant the edge-comparators are in.

For that purpose, the photodetector array of pixels is aligned along first and second axes and divided into four quadrants upper left, upper right, lower left and lower right and the selecting factor is introduced by adding to comparators along the first axis a positive offset for both left quadrants and a negative offset for both right quadrants, and by adding to comparators along the second axis a positive offset for both lower quadrants and a negative offset for both upper quadrants.

A further refinement can be made to deal with a further problem. The optical alignment of the laser illumination might not be perfect, and so the central point of the Gaussian illumination might not correspond to the central point of the pixel array. To handle this issue, the algorithm measures the central point of illumination (with respect to X and Y), and changes the sign of the offset polarity of each edge comparator to effectively move the matrix central point to correspond to the illumination central point.

For that purpose, the method further comprises a step consisting of determining the central point of a Gaussian illumination of the coherent light source and wherein the four quadrants are determined in relation with the central point of the Gaussian illumination.

Alternatively, since the coherent light source illuminates with a Gaussian shaped beam, the selecting factor is introduced by adding to the comparators an offset being adjusted in function of the Gaussian roll-off band. It may be further provided that the offset is inverted according to the Gaussian roll-off sign.

Since the algorithm reads the inflection count (along both axes X and Y) during every "flash" of the laser. A number of flashes (N) are averaged to produce an average inflection count (for X and Y), and the larger of the X or Y count is checked against a defined window. Then, the algorithm adjusts the offset voltage so that the count will stay within the defined window.

Additional enhancements are included to better handle various "end" conditions. For example, while the highest count of X or Y controls the algorithm, the other lower count of X or Y is also checked to make sure that it does not drop below a certain threshold. If it does, the offset may not be adjusted further.

BRIEF DESCRIPTION OF THE DRAWINGS

Other aspects, features and advantages of the present invention will be apparent upon reading the following detailed description of non-limiting examples and embodiments made with reference to the accompanying drawings.

DETAILED DESCRIPTION OF THE INVENTION

Figure 1:
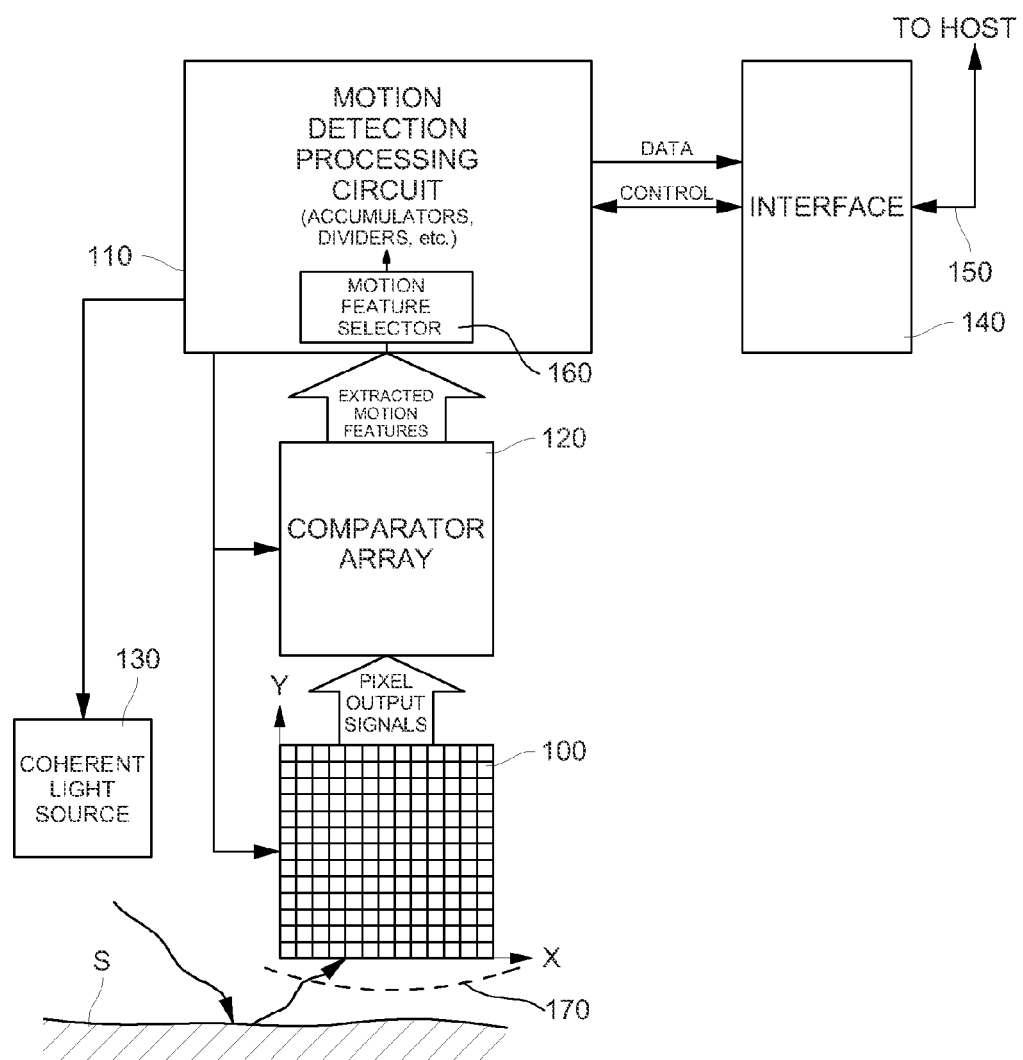
FIG. 1 represents a generalized schematic bloc diagram of an optical pointing device.
Figure 2:
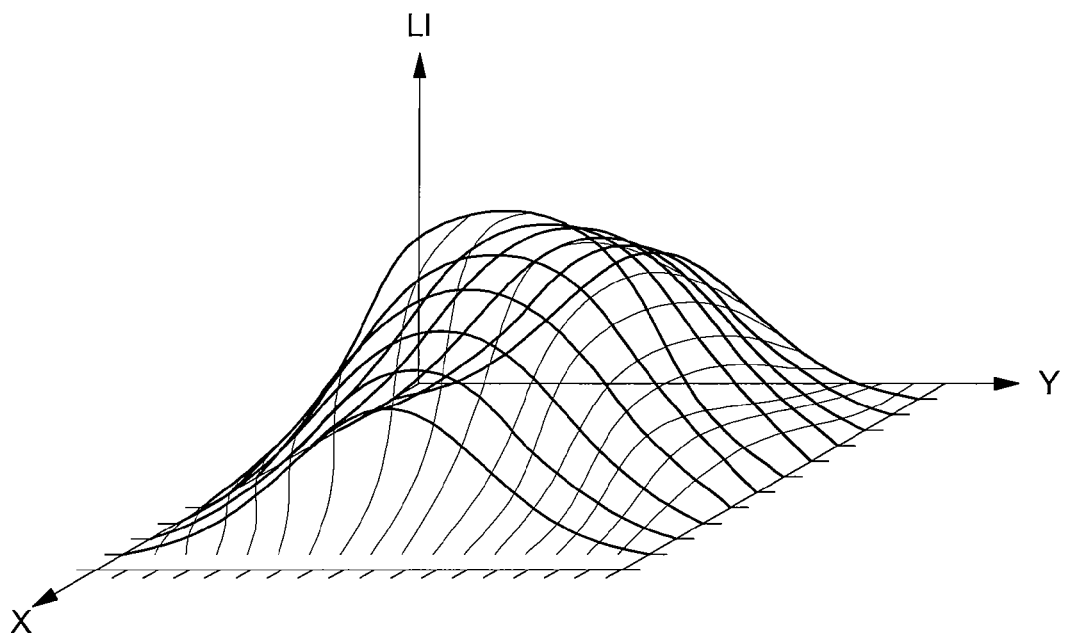
FIG. 2 shows a three-dimensional image of the laser illumination which has a fairly steep Gaussian gradient.
Figure 3:
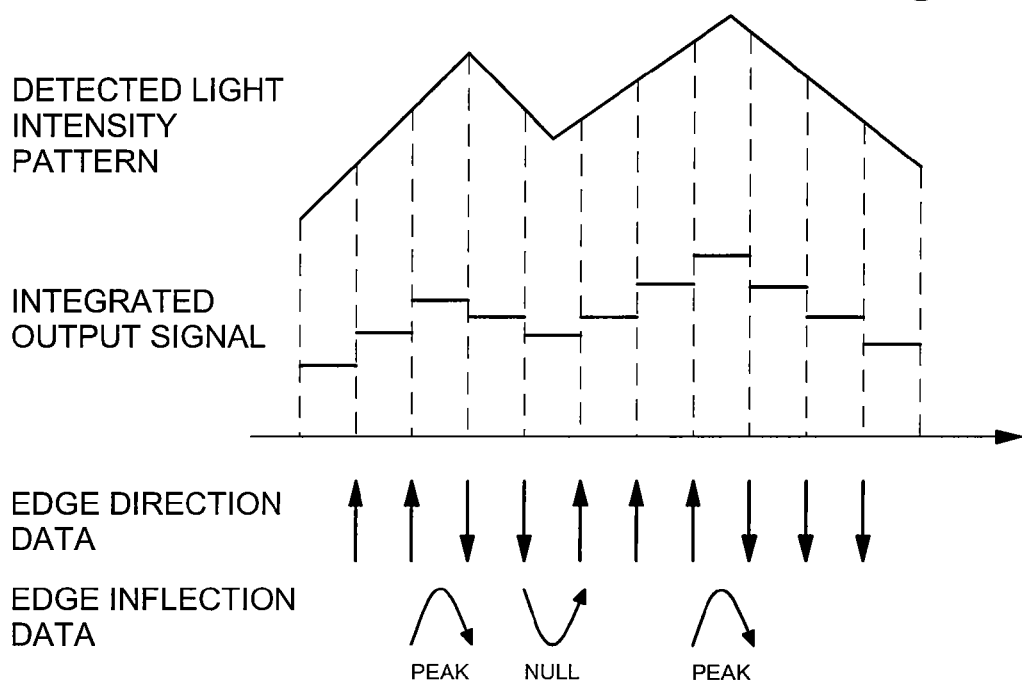
FIG. 3 is a schematic illustration of edge inflection conditions, or peaks and nulls, derived from a sequence of edge direction conditions along a determined axis of the photodetector array.

The following description, which concerns a method for measuring relative motion between an illuminated portion of a surface and an optical sensing device comprising a coherent light source and a photodetector comprising an array of pixels and comparators for extracting motion features, is given by way of a non limiting example in relation with FIGS. 1 to 3.

Algorithms that may be used for determining the measurement of the relative motion between the optical sensing device and the illuminated portion of the surface based on extracted edge direction data are given by way of example in US Patent Application Publication No 2005/0062720 filed in the name of the same Assignee and enclosed herewith in its entirety by way of reference. It is understood that various adaptations may be done on these algorithms.

According to these algorithms, extracted motion features are defined as edge direction data given by comparing light intensity between pixels, namely a first edge condition, or positive edge, defined as a condition wherein the light intensity of a first pixel is less than the light intensity of a second pixel, and a second edge condition, or negative edge, defined as a condition wherein the light intensity of the first pixel is greater than the light intensity of the second pixel.

Further, referring to the "Peak/Null Motion Detection" algorithm each row and column of the photodetector array are further analysed to find specific inflection conditions (hereinafter defined as a first inflection condition, or "peak", and a second inflection condition, or "null") in the direction of successive edges along a selected axis (in practice along both the X and Y axes). As illustrated in FIG. 3, the first inflection condition, or peak, is defined as the succession, along a determined axis (X or Y), of a positive edge (arrow pointing upwards in FIG. 3) followed by a negative edge (arrow pointing downwards in FIG. 3). Similarly, the second inflection condition, or null, is defined as the succession, along the determined axis, of a negative edge followed by a positive edge.

Considering now FIG. 1, it represents a generalized schematic bloc diagram of an optical pointing device. It comprises a photodetector array 100 including a plurality of pixels, this photodetector array 100 being coupled to processing means 110 (or motion detection processing circuit) for processing the signals outputted by the photodetector array 100.

A comparator array 120 may be interposed between processing means 110 and array 100, this comparator array 120 including a plurality of comparator circuits each for comparing the light intensity of a first pixel of array 100 with the light intensity of a second pixel of array 100 and for outputting resulting motion feature conditions.

The optical pointing device further comprises at least one coherent light source 130 such as a laser illumination source, which produces radiation at a determined flash rate, that impinges with a determined gradient on a portion of a surface S. Surface S may be a planar or non-planar surface, such as a surface over which the pointing device is moved (as in the case of an optical mouse), the surface of a ball (as in the case of an optical trackball) or any other suitable surface that may provide an appropriate speckled intensity pattern for detection by photodetector array 100.

Processing means 110 is further adapted to communicate in a bi-directional manner with an interface 140 that communicates in turn with a host system (not illustrated) over a bus 150. Cursor control signals (and eventually other signals related to the optical pointing device) are supplied to the host system over bus 150. Processing means 110 may also receive information, such as configuration signals, over bus 150 from the host system.

Processing means 110 is essentially designed to intermittently sample the pixel outputs of photodetector array 100 in accordance with a defined sequence. The information of two successive samples or speckled images is compared and a relative motion measurement is extracted by processing means 110. The adequate cursor control signals are then derived from the relative motion measurement and transmitted to the host system via line interface 140.

However, as it has been already mentioned in the introduction of the specification, the light intensity pattern detected by photodetector device 100 forms a speckled image which presents to many motion features which render motion detection less reliable. For that purpose according to the present invention, processing means 110 are provided with a very simple selecting factor 160 which promotes detection of one type of motion feature rather than the other type. Such simple selecting factor will be explained and better understood below in relation with FIGS. 2, 2a and 2b.

FIG. 2 shows a three-dimensional image of the laser illumination which has a fairly steep Gaussian gradient. The plan defined by axes X and Y represents the photodetector array and axis Z represents the detected light intensity. As can be easily seen on this image, the light intensity increases or decreases according to the quadrant and axis considered. Thus if one cuts the array of pixels in four quadrants (as shown on FIG. 2b), namely, the upper left, upper right, lower left and lower right quadrants, the light intensity (LI) departing from edges to the centre of the array of pixels will change in the following manner:

in the upper left quadrant, the light intensity increases along both X and Y axes;

in the upper right quadrant, the light intensity increases along X axis and decreases along axis Y;

in the lower left quadrant, the light intensity decreases along the X axis and increases along the Y axis; and in the lower right quadrant, the light intensity decreases along both X and Y axes.

As mentioned previously, the purpose of the algorithm is to control the average inflection count that the sensor sees. Since laser illumination has a very large spectral content, it leads to a dense inflections image, which causes the motion detection algorithms of the sensor to alias. The aliasing is usually seen as degradation of resolution with speed and/or acceleration detection (loss-of-tracking event) failure. By controlling the average inflection count, one also controls indirectly the density of the inflections image and aliasing may be prevented.

By adding an adjustable offset to the edge detection comparators in function of the quadrant, the inflection count is decreased. Actually, adding an offset to the edge detection comparators causes them to "prefer" one type of edges (positive/negative) over the other. Since an inflection is detected as one type of edge followed by the opposite type, increasing the amount of edges of one type on the account of the other will necessarily lead to a decrease in the inflection count.

For that purpose, according to an embodiment of the present invention and in accordance with the quadrant considered, the offset is adjusted in the following manner:

a negative offset for both lower quadrants along the X axis;

a positive offset for both upper quadrants along the X axis;

a positive offset for both left quadrants along the Y axis; and a negative offset for both right quadrants along the Y axis.

Since the central point of the Gaussian illumination of the coherent light source is not always centered with respect to the array of pixels, the four quadrants are preferably determined in relation with the actual central point of the Gaussian illumination.

According to another embodiment of the present invention, since the coherent light source illuminates with a Gaussian shaped beam, the selecting factor is introduced by adding to the edge comparators an offset being adjusted in function of the Gaussian roll-off band. Preferably the offset is inverted according to the Gaussian roll-off sign.

Advantageously, the algorithm reads the X and Y inflection count for every flash. N flashes are averaged to produce X and Y average inflection count. For instance, the number of consecutive flashes used to calculate the average inflection count may by default be fixed to 4. The algorithm adjusts the offset voltage, so the largest between X and Y average inflection count falls within a pre-defined window of inflection count. The window is defined for both axis X and Y, with targeted maximum and minimum average inflection counts, respectively NinfAveHi and NinfAveLo.

The offset control algorithm will adjust the comparators offset so to the higher average inflection count (the higher between X average inflection count and Y average inflection count) will fall within the window that is defined by minimum and maximum values NinfAveLo and NinfAveHi. Thus if the higher inflection count is larger than the maximum average inflection count NinfAveHi, the offset voltage will be increased. If the higher average inflection count is smaller than the minimum average inflection count NinfAveLo, the offset voltage will be decreased.

Since the algorithm is looking at the higher average inflection count, a precaution should be taken regarding the lower inflection count. One would not want this inflection count to go below some level (an extremely low inflection count also leads to performance degradation). Thus, the algorithm allows an increase of the offset voltage if the higher average inflection count is larger than the maximum average inflection count NinfAveHi and if the lower average inflection count is higher than a targeted absolute minimum inflection count NinfAveMin.

Figure 2A:
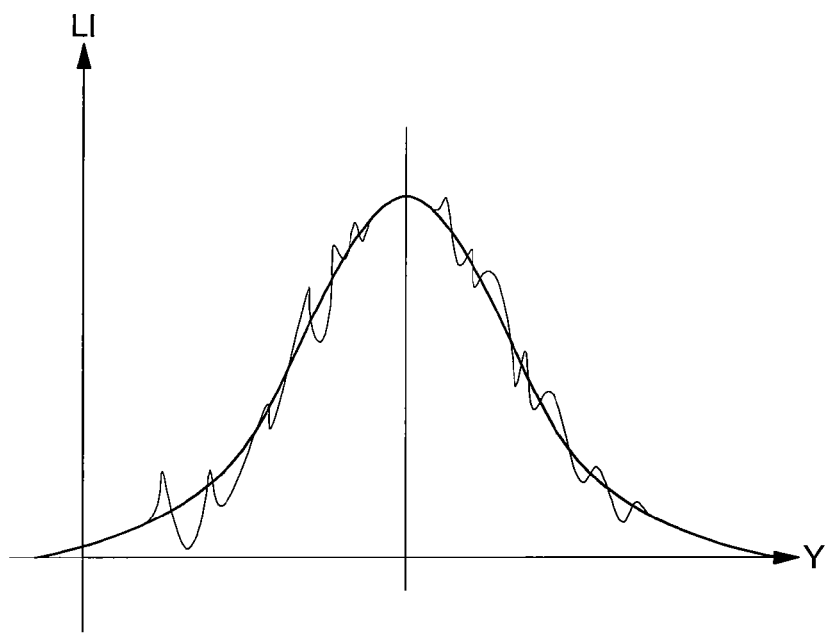
FIG. 2a represents a cut section of the plan A-A in FIG. 2.
Figure 2B:
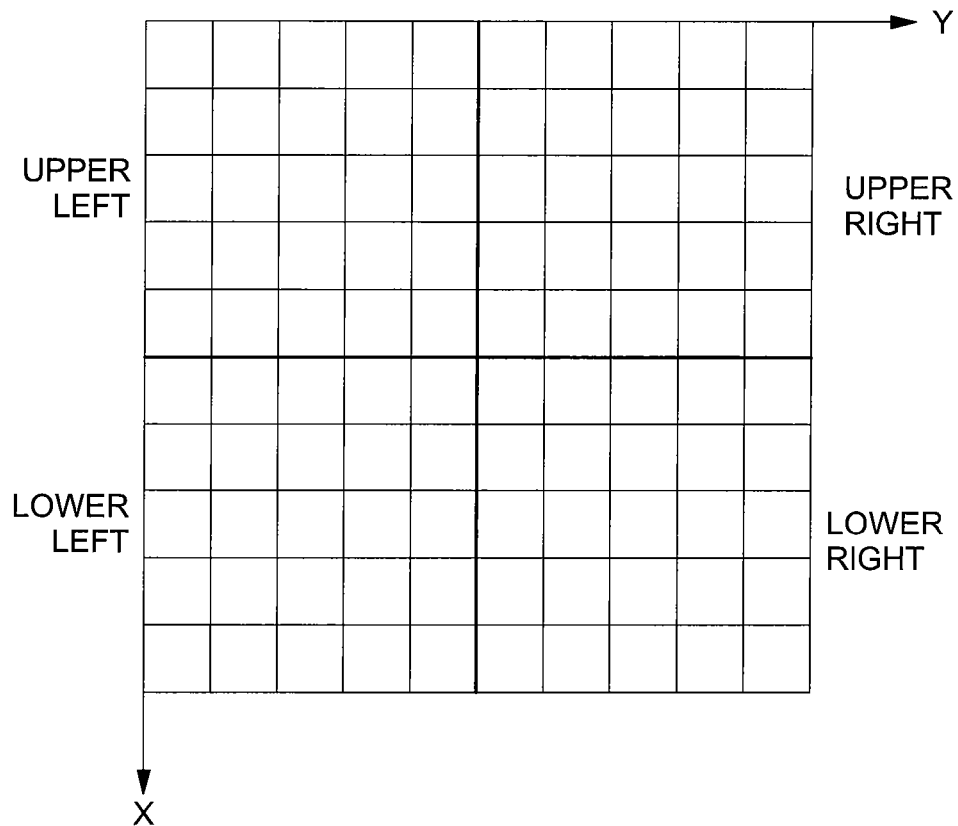
FIG. 2b represents a photodetector array cut into four quadrants.

FIG. 2a represents a cut section of the plan A-A in FIG. 2. Adding a positive offset when the light intensity increases has the effect to accentuate the light intensity increase due to the Gaussian shaped beam and eliminate succession of positive and negative edges, i.e. inflection, due to small intensity differences and therefore reduce the total number of the inflection count.

What is claimed is:

1. A method for measuring relative motion between a surface and an optical sensing device, wherein the optical sensing device comprises:
    (i) a coherent light source;
    (ii) a photodetector device; and
    (iii) a motion detection processing circuit,
wherein the photodetector device comprises:
    (1) an array of pixels; and
    (2) a plurality of comparators for extracting edge direction data,
wherein the method comprises the steps of:
    (A) illuminating a portion of the surface at a determined flash rate using the coherent light source to produce light at the determined flash rate;
    (B) detecting a speckled light intensity pattern of the illuminated portion of the surface for each flash using the array of pixels;
    (C) extracting edge direction data of two different types from the detected speckled light intensity patterns by comparing light intensity between pixels for each light intensity pattern, wherein the two different types of extracted edge direction data include first edge direction data and second edge direction data;
    (D) determining a measurement of the relative motion between the optical sensing device and the surface based on the extracted edge direction data;
wherein step (C) comprises adding, in the light intensity comparison between pixels, an offset in the comparison of light intensity for at least one region of light intensity patterns that promotes, for each region among the at least one region of the light intensity patterns, detection of the first edge direction data rather than detection of the second edge direction data.

2. The method according to claim 1, wherein the coherent light source illuminates the surface with a Gaussian shaped beam and wherein the offset is adjusted as a function of the Gaussian roll-off band.

3. The method according to claim 1, wherein the array of pixels is aligned along first and second orthogonal axes, wherein an inflection is detected as one type of edge direction data followed by another opposite type of edge direction data, and wherein the method further comprises the steps of:
    (E) counting along both axes the number of inflections for each flash;
    (F) averaging the inflection count of a determined number of flashes for each axis;
    (G) comparing a higher average inflection count from the first axis and the second axis with a defined average inflection count window; and
    (H) adjusting said offset so that the higher average inflection count stays within the defined window.

4. The method according to claim 3, wherein the window is defined by minimum and maximum average inflection count values, and wherein
    when the higher inflection count is greater than the maximum average inflection count value, then the magnitude of said offset is increased; and
    when the higher average inflection count is smaller than the minimum average inflection count, then the magnitude of said offset is decreased.

5. The method according to claim 4, wherein a targeted absolute minimum inflection count is defined and wherein the magnitude of the offset is increased when the higher average inflection count is greater than the maximum average inflection count and when the lower average inflection count is greater than the absolute minimum inflection count.

6. A method for measuring relative motion between a surface and an optical sensing device, wherein the optical sensing device comprises:
    (i) a coherent light source;
    (ii) a photodetector device; and
    (iii) a motion detection processing circuit,
wherein the photodetector device comprises:
    (1) an array of pixels; and
    (2) a plurality of comparators for extracting edge direction data,
wherein the method comprises the steps of:
    (A) illuminating a portion of the surface at a determined flash rate using the coherent light source to produce light at the determined flash rate;
    (B) detecting a speckled light intensity pattern of the illuminated portion of the surface for each flash using the array of pixels;
    (C) extracting edge direction data of two different types from the detected speckled light intensity patterns by comparing light intensity between pixels for each light intensity pattern, wherein the two different types of extracted edge direction data include first edge direction data and second edge direction data;
    (D) determining a measurement of the relative motion between the optical sensing device and the surface based on the extracted edge direction data;
wherein the coherent light source provides a light intensity substantially having a maximum value in a central region of the light source and gradually decreasing toward peripheries from the central region of the light source,
wherein the array of pixels is aligned along first and second orthogonal axes, and is divided into four quadrants comprising upper left, upper right, lower left and lower right quadrants, wherein along the first axis, when the first axis is oriented up-down, a positive offset is added to comparators of said plurality of comparators which are associated with both upper quadrants, and a negative offset is added to comparators of said plurality of comparators which are associated with both lower quadrants;
and wherein along the second axis, when the second axis is oriented left-right, a positive offset is added to comparators of said plurality of comparators which are associated with both left quadrants, and a negative offset is added to comparators of said plurality of comparators which are associated with both right quadrants.

7. The method according to claim 6, wherein the coherent light source illuminates the surface with a Gaussian shaped beam, wherein a central point of the Gaussian shaped beam impinging on the array of pixels is determined, and wherein the four quadrants are determined in relation to the central point of the Gaussian shaped beam.

8. The method according to claim 6, wherein an inflection is detected as one type of edge direction data followed by another opposite type of edge direction data, wherein the method further comprises the steps of:
   (E) counting along both axes the number of inflections for each flash;
   (F) averaging the inflection count of a determined number of flashes for each axis;
   (G) comparing the higher average inflection count from the first axis and the second axis with a defined average inflection count window; and
   (H) adjusting the positive and negative offsets of the comparators so that the higher average inflection count stays within the defined average inflection count window.

9. The method according to claim 8, wherein the window is defined by minimum and maximum average inflection count values, and wherein
   when the higher inflection count is greater than the maximum average inflection count value, then the magnitudes of the positive and negative offsets are increased; and
   when the higher average inflection count is smaller than the minimum average inflection count, then the magnitudes of the positive and negative offsets are decreased.

10. The method according to claim 9, wherein a targeted absolute minimum inflection count is defined and wherein the magnitudes of the positive and negative offsets are increased when the higher average inflection count is greater than the maximum average inflection count and when the lower average inflection count is greater than the absolute minimum inflection count.

* * * * *